(12) United States Patent
Fiedler et al.

(10) Patent No.: US 9,834,984 B2
(45) Date of Patent: Dec. 5, 2017

(54) ROLLER SHUTTER CONTROLLER

(71) Applicant: Fibar Group sp. z.o.o., Poznan (PL)

(72) Inventors: Maciej Fiedler, Poznan (PL); Robert Zdunek, Wrzesnia (PL); Bartlomiej Arcichowski, Poznan (PL)

(73) Assignee: Fibar Group S.A., Poznan (PL)

( * ) Notice: Subject to any disclaimer, the term of this patent is extended or adjusted under 35 U.S.C. 154(b) by 259 days.

(21) Appl. No.: 14/530,145

(22) Filed: Oct. 31, 2014

(65) Prior Publication Data

US 2015/0114574 A1 Apr. 30, 2015

Related U.S. Application Data

(60) Provisional application No. 61/897,946, filed on Oct. 31, 2013.

(51) Int. Cl.
*E06B 9/32* (2006.01)
*E05F 15/71* (2015.01)
(Continued)

(52) U.S. Cl.
CPC ............... *E06B 9/32* (2013.01); *E05F 15/71* (2015.01); *E05F 15/77* (2015.01); *E06B 9/68* (2013.01);
(Continued)

(58) Field of Classification Search
CPC ..... G08B 13/19684; G08B 25/10; E06B 9/32; E06B 9/68; E06B 2009/6809; E06B 2009/6818; E06B 2009/6836; G08C 17/00; G08C 17/02; G08C 2201/50; G08C 2201/30; G08C 2201/42; G08C 2201/51;
(Continued)

(56) References Cited

U.S. PATENT DOCUMENTS

| | | |
|---|---|---|
| 3,873,927 A | 3/1975 | Overall |
| D301,869 S | 6/1989 | Schwartz |

(Continued)

FOREIGN PATENT DOCUMENTS

| | | |
|---|---|---|
| CA | 70745 | 6/1992 |
| CA | 74034 | 3/1994 |

(Continued)

OTHER PUBLICATIONS

Automated Home, Case Study: UK Z-Wave Home Automation Setup, www.automatedhome.co.uk/installaton/case-study-uk-z-wave-home-automation-setup.html (13 pages), Jun. 17, 2014.

(Continued)

*Primary Examiner* — Crystal J Barnes-Bullock
(74) *Attorney, Agent, or Firm* — McAndrews, Held & Malloy, Ltd.

(57) ABSTRACT

A shutter control system for use with a network. The shutter control system includes a network device coupled to the network to communicate an indication. The shutter control system also includes a shutter controller configured to receive the indication, to determine if the indication meets a predefined condition, and, in response to the indication meeting the predefined condition, to communicate an actuation signal. A shutter device, having at least one motor, receives the actuation signal, and operates the at least one motor based on the received actuation signal.

14 Claims, 5 Drawing Sheets

(51) Int. Cl.
  *E05F 15/77* (2015.01)
  *H04L 12/28* (2006.01)
  *H04L 12/64* (2006.01)
  *E06B 9/68* (2006.01)

(52) U.S. Cl.
  CPC ...... *H04L 12/2803* (2013.01); *H04L 12/6418* (2013.01); *E05Y 2900/00* (2013.01); *E05Y 2900/106* (2013.01); *E06B 2009/6809* (2013.01); *E06B 2009/6818* (2013.01)

(58) Field of Classification Search
  CPC ............. G08C 2201/93; G06F 3/0484; G06F 3/04842; G06F 3/04847; H04M 1/7253; H04M 1/72533; H04M 1/72572; H04M 2250/12; H04L 12/282; H04L 12/2803; H04L 63/10; H04L 67/025; A47H 2005/025; A47H 5/02; A47H 5/0325; G05B 15/02; G05B 19/042; E05F 15/77; G05F 1/66; H02J 13/0086
  See application file for complete search history.

(56) References Cited

U.S. PATENT DOCUMENTS

| | | | |
|---|---|---|---|
| D325,902 S | 5/1992 | Hudson et al. | |
| D334,561 S | 4/1993 | Crater et al. | |
| D349,687 S | 8/1994 | Khoo et al. | |
| D359,043 S | 6/1995 | Althans | |
| D381,633 S | 7/1997 | Hiyakumoto et al. | |
| D396,471 S | 7/1998 | Kolinen | |
| D402,909 S | 12/1998 | Stanuch | |
| D405,424 S | 2/1999 | Winkler et al. | |
| D417,871 S | 12/1999 | Hisatsune | |
| D481,056 S | 10/2003 | Kawasaki et al. | |
| D487,728 S | 3/2004 | Murray | |
| D489,337 S | 5/2004 | Murray | |
| D492,262 S | 6/2004 | Murray | |
| D494,583 S | 8/2004 | Guerrera | |
| 6,853,709 B1 * | 2/2005 | Sakadjian ............ H04M 11/025 379/102.01 | |
| 6,892,751 B2 | 5/2005 | Sanders | |
| D513,497 S | 1/2006 | Whitehouse | |
| D514,118 S | 1/2006 | Christianson | |
| D520,500 S | 5/2006 | Storti et al. | |
| D521,403 S | 5/2006 | Shain et al. | |
| D523,873 S | 6/2006 | Huang | |
| D533,186 S | 12/2006 | Chen et al. | |
| D533,851 S | 12/2006 | Yoon | |
| D540,752 S | 4/2007 | Hayes et al. | |
| 7,206,645 B2 | 4/2007 | Seguin | |
| D541,762 S | 5/2007 | Nakagawa et al. | |
| D548,702 S | 8/2007 | Girard | |
| 7,253,741 B2 | 8/2007 | Fiorletta et al. | |
| 7,309,216 B1 | 12/2007 | Spadola, Jr. et al. | |
| D559,233 S | 1/2008 | Tang | |
| D567,187 S | 4/2008 | Oba et al. | |
| D570,297 S | 6/2008 | Gibbons et al. | |
| D588,484 S | 3/2009 | Bandringa et al. | |
| 7,498,936 B2 * | 3/2009 | Maeng ................. G08B 21/24 340/10.3 | |
| D604,254 S | 11/2009 | Lanfear et al. | |
| D604,725 S | 11/2009 | Chen | |
| D609,701 S | 2/2010 | Hou | |
| D610,479 S | 2/2010 | Shi | |
| D621,287 S | 8/2010 | Kaneko et al. | |
| D631,165 S | 1/2011 | Fisher et al. | |
| D631,446 S | 1/2011 | Lanfear et al. | |
| D638,372 S | 5/2011 | Clymer et al. | |
| D639,752 S | 6/2011 | Li et al. | |
| D646,640 S | 10/2011 | Clymer et al. | |
| D647,504 S | 10/2011 | Choi | |
| 8,154,398 B2 | 4/2012 | Rolf et al. | |
| 8,165,719 B2 * | 4/2012 | Kinney .................. E06B 7/08 318/266 | |
| D660,261 S | 5/2012 | Huang et al. | |
| D660,809 S | 5/2012 | Kern Koskela et al. | |
| D664,460 S | 7/2012 | Aurongzeb et al. | |
| D665,290 S | 8/2012 | Bhate et al. | |
| D665,773 S | 8/2012 | Behringer et al. | |
| D671,851 S | 12/2012 | Treharne et al. | |
| D678,097 S | 3/2013 | Elwell et al. | |
| D678,258 S | 3/2013 | Seto | |
| D680,015 S | 4/2013 | Hauser et al. | |
| D682,777 S | 5/2013 | Gupta et al. | |
| D683,251 S | 5/2013 | Dumas et al. | |
| D689,441 S | 9/2013 | Kah, Jr. et al. | |
| D692,332 S | 10/2013 | Ni et al. | |
| D693,311 S | 11/2013 | Biller et al. | |
| D695,234 S | 12/2013 | Santiago | |
| D695,693 S | 12/2013 | Lee et al. | |
| D699,177 S | 2/2014 | Higashi | |
| 8,643,465 B2 * | 2/2014 | Fitzgibbon ......... G07C 9/00182 340/5.2 | |
| D703,156 S | 4/2014 | Parsons et al. | |
| D703,566 S | 4/2014 | Chen et al. | |
| D704,625 S | 5/2014 | Tsutsumi et al. | |
| D705,719 S | 5/2014 | Wong | |
| D706,152 S | 6/2014 | Ni et al. | |
| D706,228 S | 6/2014 | Ishiura | |
| 8,836,522 B2 | 9/2014 | Thorpe et al. | |
| 9,015,994 B2 * | 4/2015 | Lamb ...................... E05F 15/79 49/199 | |
| 9,118,220 B2 * | 8/2015 | Lamb .................. H02J 13/0086 | |
| 9,161,649 B2 * | 10/2015 | Rastegar ............. A47H 5/0325 | |
| 9,354,798 B2 * | 5/2016 | Sasaki .................. G08C 17/00 | |
| 2005/0035854 A1 * | 2/2005 | Gupta .................. A61B 5/0062 340/531 | |
| 2008/0130791 A1 * | 6/2008 | Fitzgibbon ......... G07C 9/00182 375/310 | |
| 2008/0133063 A1 | 6/2008 | Bisson et al. | |
| 2009/0231129 A1 | 9/2009 | Edwards et al. | |
| 2009/0240377 A1 | 9/2009 | Batzler et al. | |
| 2011/0012726 A1 | 1/2011 | Jessiman et al. | |
| 2011/0061014 A1 | 3/2011 | Frader-Thompson et al. | |
| 2011/0093217 A1 | 4/2011 | Kates | |
| 2011/0130880 A1 | 6/2011 | Nishino et al. | |
| 2011/0289561 A1 | 11/2011 | Ivanov et al. | |
| 2012/0130513 A1 | 5/2012 | Hao et al. | |
| 2013/0082835 A1 | 4/2013 | Shapiro et al. | |
| 2013/0145826 A1 | 6/2013 | Richarz et al. | |
| 2013/0241479 A1 | 9/2013 | Wright, Jr. et al. | |
| 2014/0005809 A1 | 1/2014 | Frei et al. | |
| 2014/0352896 A1 * | 12/2014 | Han ........................ E06B 9/68 160/310 | |
| 2015/0074605 A1 * | 3/2015 | Sasaki .................... G08C 17/00 715/833 | |

FOREIGN PATENT DOCUMENTS

| | | |
|---|---|---|
| CA | 74569 | 8/1994 |
| CA | 74610 | 8/1994 |
| CN | 3274285 | 1/2003 |
| CN | 301936325 S | 5/2012 |
| CN | 201230432179 | 6/2013 |
| CN | 302767627 S | 3/2014 |
| DE | 4029615 A1 | 4/1992 |
| EP | 0241676 A2 | 10/1987 |
| EP | 000137351-0008 | 2/2004 |
| EP | 000145644-0001 | 3/2004 |
| EP | 000166350-0001 | 4/2004 |
| EP | 000242888-0001 | 10/2004 |
| EP | 000253380-0002 | 11/2004 |
| EP | 000268032-0002 | 12/2004 |
| EP | 000321971-0007 | 4/2005 |
| EP | 000352943-0001 | 6/2005 |
| EP | 000481304-0001 | 2/2006 |
| EP | 000536438-0001 | 5/2006 |
| EP | 000603709-0002 | 10/2006 |
| EP | 000623608-0001 | 11/2006 |
| EP | 000757620-0004 | 7/2007 |
| EP | 000779061-0001 | 8/2007 |
| EP | 000792791-0001 | 9/2007 |

(56) References Cited

FOREIGN PATENT DOCUMENTS

| | | |
|---|---|---|
| EP | 000827118-0001 | 11/2007 |
| EP | 000830542-0006 | 11/2007 |
| EP | 000883269-0001 | 2/2008 |
| EP | 001015788-0001 | 10/2008 |
| EP | 001032437-0001 | 11/2008 |
| EP | 001032437-0002 | 11/2008 |
| EP | 001057392-0001 | 12/2008 |
| EP | 001223457-0002 | 6/2010 |
| EP | 001720590-0001 | 6/2010 |
| EP | 001781188-0001 | 11/2010 |
| EP | 001259204-0001 | 2/2011 |
| EP | 001828070-0001 | 2/2011 |
| EP | 001295182-0001 | 9/2011 |
| EP | 001914029-0004 | 9/2011 |
| EP | 001920018-0004 | 9/2011 |
| EP | 002041764-0001 | 5/2012 |
| EP | 002074989-0001 | 7/2012 |
| EP | 002079673-0001 | 7/2012 |
| EP | 002143784-0002 | 11/2012 |
| EP | 002163360-0001 | 1/2013 |
| EP | 002177667-0001 | 2/2013 |
| EP | 002242800-0001 | 5/2013 |
| EP | 002278887-0001 | 7/2013 |
| EP | 002293415-0002 | 8/2013 |
| EP | 002440198-0001 | 4/2014 |
| EP | 002465476-0002 | 5/2014 |
| JP | 1177905 S | 6/2003 |
| JP | 1203574 S | 4/2004 |
| JP | 1220720 S | 10/2004 |
| JP | 1333401 S | 6/2008 |
| JP | 1348157 S | 1/2009 |
| JP | 1400836 S | 11/2010 |
| JP | 1422635 S | 9/2011 |
| JP | 1463123 S | 2/2013 |
| JP | 1491697 S | 3/2013 |
| JP | 1386160 S | 4/2013 |
| JP | 1471658 S | 6/2013 |
| JP | 1475417 S | 7/2013 |
| JP | 1477025 S | 8/2013 |
| JP | 1477336 S | 8/2013 |
| JP | 1400674 S | 10/2013 |
| JP | 1498774 S | 6/2014 |
| WO | DM053972 | 11/2000 |
| WO | DM/058681 | 11/2001 |
| WO | DM059634 | 3/2002 |
| WO | DM066764 | 5/2005 |
| WO | DM/074389 | 9/2010 |
| WO | DM074708 | 11/2010 |
| WO | DM075611 | 12/2010 |
| WO | DM075517 | 2/2011 |
| WO | DM076583 | 5/2011 |
| WO | DM078408 | 11/2011 |
| WO | DM079061 | 2/2012 |
| WO | DM078643 | 6/2012 |
| WO | DM078737 | 7/2012 |
| WO | DM079877 | 12/2012 |
| WO | DM081654 | 8/2013 |
| WO | DM082066 | 10/2013 |
| WO | DM083551 | 2/2014 |

OTHER PUBLICATIONS

The Online Architecture and Design Exhibition, Interface Module for Home Automation System—EXB-REL8—AMX—Videos, www.archiexpo.com/prod/amx/interface-module-home-automation-systems-51274-1065061.html (18 pages), Jun. 17, 2014.
Graves on SOHO Technology, Vera Home Automation, Michael Graves, Oct. 23, 2008, www.mgraves.org/2008/10/vera-home-automation/ (6 pages), Jun. 17, 2014.
TaHomA—Home Motion by Somfy, Somfy Systems, Creator of TaHomA, the New Home Control System, www.somfytahoma.com/home-automation-products/home-automation-controllers-products/home-automation-somfy--tahoma-controller (3 pages), Jun. 17, 2014.
Introduction to X10 Home Automation Technology, by Tony Northrup, Jan. 10, 2005, www.oreillynet.com/pub/a/network/2005/01/10/x10_hmhck.html (5 pages), Jun. 17, 2014.
Fibaro Flood Sensor URL: http://www.fibaro.com/en/the-fibaro-system/flood-sensor.
Wireless Leakage Sensor URL: http://smarthome01.com/2014/03/03/wireless-leakage-sensor/.
Occupancy Sensor URL: http://www.tech-faq.com/occupancy-sensors.html.

* cited by examiner

ROLLER SHUTTER CONTROLLER

CLAIM OF PRIORITY/INCORPORATION BY REFERENCE

This patent application makes reference to, claims priority to and claims benefit from U.S. Provisional Patent Application Ser. No. 61/897,946 entitled "Roller Shutter Controller" filed on Oct. 31, 2013, which is hereby incorporated herein by reference in its entirety.

TECHNICAL FIELD

Aspects of the present disclosure relate to electronic systems and/or networking. More specifically, certain implementations of the present disclosure relate to a roller shutter controller.

BACKGROUND

Existing methods and systems for providing device control can be costly, cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for a roller shutter controller, substantially as shown in and/or described in connection with at least one of the figures, as set forth more completely in the disclosure and/or the claims.

These and other advantages, aspects and novel features of the present disclosure, as well as details of illustrated implementation(s) thereof, will be more fully understood from the following description and drawings.

DETAILED DESCRIPTION

Figure 1:
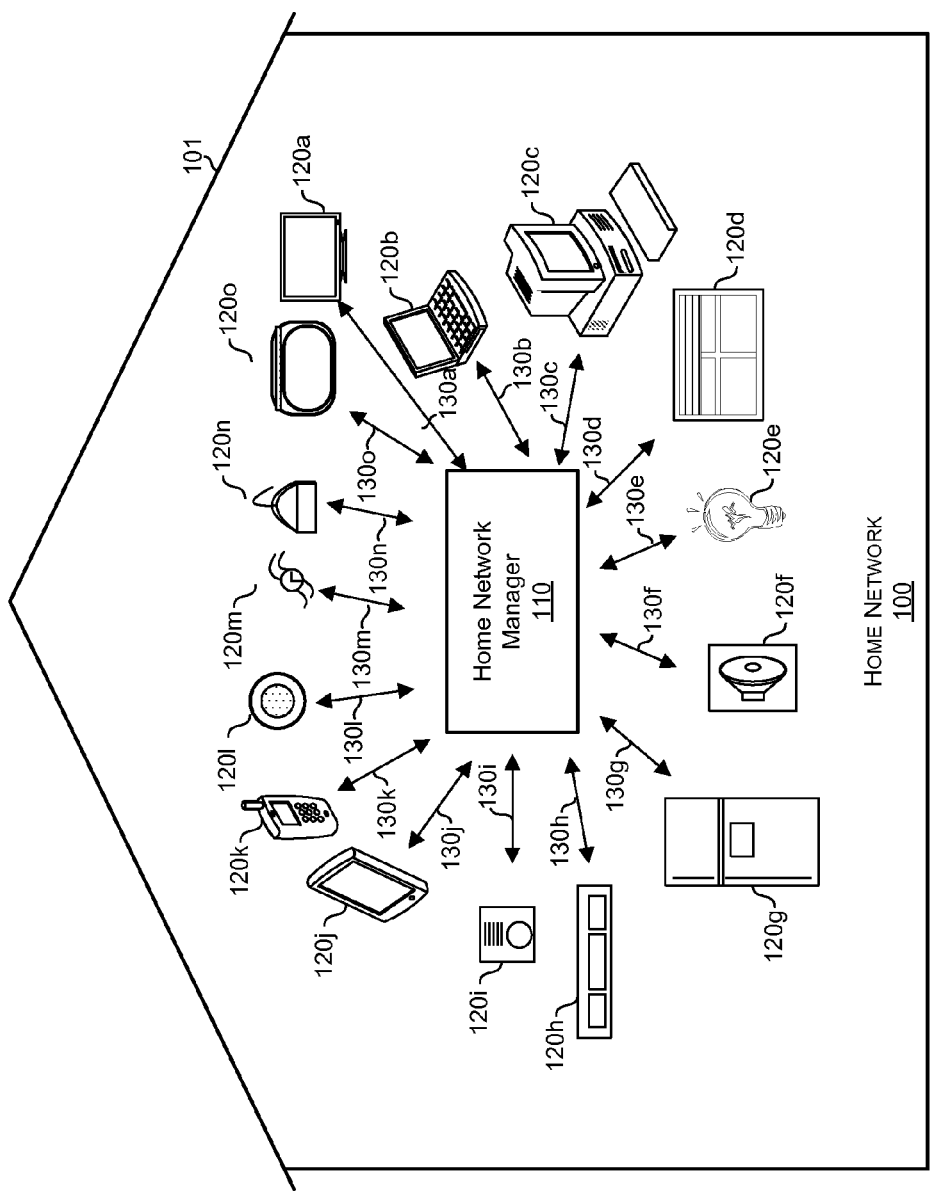
FIG. 1 illustrates an example home network.

Certain implementations may be found in a method and system for a roller shutter controller. In one embodiment, the invention provides a shutter control system for use with a network. The shutter control system includes a network device coupled to the network to communicate an indication. The shutter control system also includes a shutter controller configured to receive the indication, to determine if the indication meets a predefined condition, and, in response to the indication meeting the predefined condition, to communicate an actuation signal. A shutter device, having at least one shutter motor, receives the actuation signal, and operates the at least one shutter motor based on the received actuation signal.

In another embodiment, the invention provides a shutter control system. The shutter control system includes a network device to perform a function, and a network manager to communicate control signals to the network device. The shutter control system also includes a shutter system that is coupled to the network manager. The shutter system includes a sensor to sense a condition, and a shutter controller, in response to the sensed condition meeting a predefined condition, to communicate an actuation signal. The shutter system also includes a shutter device that has at least one motor to receive the actuation signal, and to operate the at least one motor based on the received actuation signal. The shutter system also includes a communication transceiver, in response to having received the actuation signal, to communicate the actuation signal to the network manager. The network manager further processes the actuation signal to generate a control signal associated with the network device and the actuation signal, and to communicate the control signal to the network device to perform the function.

In yet another embodiment, the invention provides a method of controlling a device via a) a shutter control system having at least one motor, and being remote from the device, and b) a network manager operable to communicate control signals to the device. The method includes sensing at the shutter control system a condition, and in response to the sensed condition meeting a predefined condition, actuating the at least one motor. In response to the actuation of the at least one motor, the method includes communicating the sensed condition to the network manager, and transmitting the control signals from the network manager to the device.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and/or "module" refer to functions than may be performed by one or more circuits. As utilized herein, the term "example" means serving as a non-limiting example, instance, or illustration. As utilized herein, the terms "for example" and "e.g." introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

FIG. 1 illustrates an example home network. Referring to FIG. 1, there is shown a home network 100.

The home network 100 may correspond to a location 101. The location 101 may, for example, correspond to a residence (e.g., home, apartment) or non-residence premises (e.g., small business, school, library, factory, or the like). In this regard, the home network 100 may, for example, comprise a plurality of home network elements, such as, for example, a plurality of home network elements 120a-120o. The home network elements (e.g., home network elements 120a-120o) may, for example, comprise one or more devices, systems, fixtures, appliances, and/or other circuitry. The home network elements (e.g., home network elements 120a-120o) may comprise, for example, one or more televisions 120a, one or more computers (e.g., laptop computer 120b, desktop computer 120c), one or more personal and/or handheld devices (e.g., tablet 120j, mobile phone 120k, smart watch 120m), one or more multimedia devices and/or components (e.g., speakers 120f), one or more structural fixtures (e.g., windows/window blinds 120d, smart watch), one or more lighting and/or electrical fixtures 120e, one or more appliances (e.g., refrigerator 120g), one or more environmental sensory devices 120h (e.g., thermometers, humidity meters), and/or one or more security devices 120i (e.g., a smoke detector, a carbon monoxide detector, a security alarm, a motion detector) one or more sensors and/or controllers (e.g., intelligent motion sensor 1201, roller shutter controller 120n) and/or other devices (e.g., touch-less swipe control 120o).

The disclosure is not limited to any particular type of a home network. Furthermore, the disclosure is not limited to any particular combination of home network elements. It is to be understood that although the network is referred to as a "home network" throughout the disclosure, the disclosure is not limited in this way. Specifically, the network may comprise any other network that may be operable to control one or more network elements. For example, the network of the disclosure (whether or not referred to as a "home network") may be implemented in a residential, non-residential, commercial, industrial and/or any other setting. Similarly, the network elements may comprise network elements (whether or not referred to as a "home network elements") implemented in a residential, non-residential, commercial, industrial and/or any other setting.

In some instances, the home network 100 may incorporate a home network manager 110. The home network manager 110 may comprise suitable circuitry, interfaces, logic, and/or code for implementing various aspects of the present disclosure. For example, the home network manager 110 may be configured for use in managing, servicing, and/or interacting with one or more home network elements. Although the home network manager 110 is shown in FIG. 1 as a single and separate device, the disclosure is not limited in this way. For example, in some implementations, one or more functions of the home network manager 110 may be provided by one or more home network elements (e.g., providing user interface via tablet 120j and/or television 120a). In an example embodiment of the disclosure, the home network manager 110 may be implemented as a virtual platform, such as, for example, one or more software modules may run on, and/or utilize resources of one or more home network elements (e.g., laptop 120b, desktop 120c).

The home network manager 110 may be configured to communicate with one or more elements (e.g., home network devices, home network elements) in a home network. In an example embodiment of the disclosure, the home network manager 110 may be operable to communicate with one or more devices and/or systems that may be external to a home network, using, for example, optical, wired and/or wireless communication links.

Although the home network manager 110 is illustrated as a single device, the disclosure is not limited in this way. For example, the home network manager may comprise one or more home network manager that may each interact with one or more home network elements (e.g., home network elements 120a-120o). In an example embodiment of the disclosure, each of the one or more home network managers may be associated with particular one or more home network elements. In another example, one or more of the one or more home network managers may be associated with any one or more home network elements (e.g., home network elements within range of a particular home network manager, with best communication path).

In an example embodiment of the disclosure, the home network manager 110 may be implemented in an integrated or a distributed system. An integrated system may be implemented, for example, on one computer, server, machine or device, where the integrated system may be configured to perform some or all of the functions, features and/or operations of the home network manager 110 as described herein. A distributed system may be implemented with multiple components (e.g., computers, servers, machines and/or devices), where each of the multiple components may be configured to perform some or all of the functions, features and/or operations of the home network manager 110 as described herein. Each function, feature and/or operation may be implemented on one or more of the components of the distributed system. For example, a specific feature, function and/or operation may be implemented only one component of the distributed system or it may be implemented across multiple components of the distributed system.

In an example embodiment of the disclosure, in addition to or instead of the use of one or more home network managers, the home network 100 may comprise one or more master controllers for controlling one or more home network elements. A master controller may be pre-programmed and/or programmable to control one or more home network elements. A master controller may comprise, for example, a remote controller.

Although the disclosure may refer to a single home network manager, it is to be understood that the disclosure is not limited in this way. For example, the home network manager may comprise one or more home network managers that individually and/or in the aggregate may be implemented as integrated and/or a distributed system.

The home network manager 110 may interact with one or more of the home network elements 120a-120o via corresponding links 130a-130o, which may be supported by the home network manager 110 and/or the corresponding home network element(s). For example, the links 130a-130o may be implemented and/or configured to operate using a wireless protocol, such as, for example, a Z-wave protocol. In an example embodiment of the disclosure, the home network 100 may be implemented as Z-Wave network. However, the disclosure is not limited in this way. For example, the home network 110 may comprise one or more wired and/or wireless links and/or protocol. Wireless links and/or protocols, may comprise, for example, WPAN (e.g., Bluetooth or ZigBee), low power links (e.g., Bluetooth LE (BLE), Bluetooth Smart, iBeacon), near field communication protocols (e.g., NFC) and/or WLAN (WiFi/802.11) protocols and/or any other wireless links and/or protocols suitable for implementation consistent with the disclosure. Wired protocols and/or links may comprise, for example, Ethernet, Universal Serial Bus (USB), and/or any other wired links and/or protocols suitable for implementation consistent with the disclosure.

In an example embodiment of the disclosure, home network manager 110 may interact with one or more home network elements (e.g., home network elements) directly and/or indirectly. For example, the home network manager 110 may interact with one or more home network elements directly through a corresponding link (e.g., wireless, wired link/connection).

In another example, the home network manager 110 may interact with one or more home network elements indirectly though, for example, a converter (e.g., global cache.) In this regard, the home network manager 110 that supports one or more particular network interfaces and/or other interfaces (e.g., USB) may be operable to interact with a particular network element (and/or another device) that may otherwise be incompatible with one or more of the one or more particular network and/or other interfaces supported by the home network manger 110. The interaction may be achieved though, for example, a converter and/or a translator. The converter and/or the translator may each comprise suitable logic, circuitry, interfaces, and/or code that may be operable to facilitate communication between a home network manager (e.g., the home network manger 110) and a home network element (home network elements 120a-120o).

In another example, the home network manager 110 may interact with one or more home network elements indirectly though, for example, other network elements. In this regard, the home network manager 110 may interact with one or more home network elements on, for example, a mesh network. An example mesh network (not shown) may facilitate communication (e.g., transmission of messages, signals, data frames) to and/or from the home network manager (e.g., the home network manager 110) to and/or from a particular network element where the communication may, for example, pass through one or more other network elements before reaching the particular network element and/or the home network manager.

In an example embodiment of the disclosure, the home network manager 110 may be operable to support one or more communication methods from one or more other home network devices (e.g., home network elements 120a-120o). For example, one or more home network elements may communicate with the home network manager 110 utilizing a particular wireless link and/or protocol (e.g., Z-wave) and/or a particular wired link and/or protocol (e.g., Ethernet), while one or more other home network elements may communicate with the home network manager 110 utilizing a different particular wireless link and/or protocol (e.g., WiFi) and/or a different particular wired link and/or protocol (e.g., USB).

In an example embodiment of the disclosure, the same one or more home network elements may communicate with the home network manager 110 by, for example, using one or more wired and/or wireless links and/or protocols at the same and/or at different times. For example, a particular network element may communicate with the home network manager 110 using a Z-Wave communication protocol for a particular communication and may communicate with the home network manager 110 using a WiFi communication protocol for another particular communication.

In an example embodiment of the disclosure, one or more home network elements (e.g., home network elements 120a-120o) may communicate with one or more home network elements (e.g., home network elements 120a-120o) directly. In this regard, the one or more network elements may utilize one or more communication links (e.g., wireless, wired) (not shown) and/or one or more network interfaces and/or other interfaces without directing (e.g., routing the communication thought, for example, a home network manager (e.g., the home network manger 110). For example, a home network element may be operable to detect existence of one or more other network elements (e.g., on the same and/or different network) and may initiate, send and/or receive communication to and/or from the one or more other network elements.

In an example embodiment of the disclosure, one network element may be out of range of a home network manager and may communicate with one or more other network elements to determine whether the one or more other network elements are within range of a particular (e.g., a home network manager previously within range of the one network element) and/or any network manager. The range detection and/or discovery may continue from one network element to another. For example, a particular home network element may need to communicate through more than one other home network element in order to, for example, communicate with a desired home network element and/or a desired, particular and/or any home network manager (e.g., the home network manager 110). The disclosure is not limited to a communication for a purpose of range discovery/detection. The communication may comprise any type of communication and may be used for a variety of other purposes (e.g., communicating with a different network element, communicating with a home network manager, controlling an out of range device, controlling another network element).

In an example embodiment of the disclosure, one or more home network elements (e.g., home networks elements 120a-120o) may be operable to control one or more other home network elements (e.g., home networks elements 120a-120o) with and/or without intermediary, such as, for example, a home network manager (e.g., home network manager). For example, one or more home network elements may be operable to control one or more other home network elements through an intermediary. In this regard, a particular network element may communicate with an intermediary (e.g., home network manager) in order to communicate with and/or to control another home networks element. An intermediary may comprise one or more devices (e.g., a preprogrammed and/or programmable master controller, home network manager) that may be operable to control one or more network elements. In another example, a particular network element may directly communicate with and/or to control another home networks element.

In an example embodiment of the disclosure, one or more home network elements (e.g. home network elements 120a-120o) and/or other devices that may be operable to communicate on the network (and/or an associated network as described herewith) and/or that may not be operable to communicate on the network but may otherwise be tractable (e.g., GPS, iBeacon, electronic tag), with one or more other network elements, devices and/or a network manager (e.g., home network manager 110) associated with a particular network (e.g., home network 100) (and/or an associated network as described herewith), may communicate with each other, other devices (e.g., on the same network, another network and/or otherwise connected and/or tractable) and/or the network manager, and/or may be operable to determine a precise location of a particular network element, device and/or network manager utilizing various communication protocols and/or interfaces.

For example, one or more network elements (and/or other devices operable on the network, an associated network as described herewith and/or otherwise traceable) may be operable to generate and/or receive information and/or one more signals and/or messages that may be utilized in determining a location of a particular network element, device and/or network manager. In this regard, a near field communication and/or a low power interface protocol (e.g., BLE, iBeacon) may be utilized for communication between the elements, devices and/or network managers. Furthermore, one more tags (e.g., small electronic devices) may be utilized, to facilitate location of particular elements, devices and/or network managers. For example, a network element, device and/or home network manager may generate a signal and/or a message (on the network, on an associated network and/or through a built in, external, portable and/or otherwise attachable tag) that may be received by another network element, device and/or network manager.

In an example embodiment of the disclosure, one or more home network elements, devices and/or manager may cooperate (e.g., exchange information) to, for example, collectively and/or individually determine a precise location of a particular network elements, device and/or network manager based on the received one or more signals and/or messages. As an example only, a particular network element, device and/or home network manager may generate a signal and/or a message that may be received by other network element, device and/or home network device within a particular time frame. The information about the time it took to, for example, receive the particular one or more signals and/or messages (and/or the information gather from the one or more signals and/or messages, such as, for example, signal strength) may be used to determine the precise location (e.g., distance to/from the network element, device, network manager that received the particular one or more signals and/or message) of the particular network element, device and/or network manager.

In operation, the home network manager 110 may be operable to manage a home network (e.g., the home network 100). The home network manager 110 may be utilized, for example, as an interface platform for interacting with various network elements (e.g., the home network elements 120a-120o). In this regard, the home network manager 110 may support establishing and/or configuring one or more communication connections/links (e.g., the links 130a-130o) with the one or more elements of the home network 110. Once established, the connectivity between the home network manager 110 and the home network elements (e.g., network elements 120a-120o) may, for example, be utilized to enable centralized monitoring, control, and/or management of the home network elements, and/or of the home network 100 as a whole. For example, the home network manager 110 may be operable to control operations of certain elements (e.g., turn on television 120a, switch to particular channel(s) at particular days/times, and/or record if recording is supported); monitor environment in the home network, such as by obtaining environmental readings (e.g., temperature, humidity, etc.) via example environmental sensory devices 120h, and may process these readings (e.g., to determine if/when to adjust other home network elements accordingly); adjust one or more example lighting and/or electrical fixtures 120e (e.g., turn lights on or off); lower/raise example window (blinds) 120d; adjust operations of example appliances (e.g., refrigerator 120g), such as, for example, based on a preconfigured power efficiency/optimization profile; monitor for any indications of a security/safety problem, based on, for example, input from example security devices 120i, and/or act accordingly (e.g., send notifications to users, such as by texting example smartphone 120k, and/or automatically notify authorities, e.g., by dialing '911' and/or contacting preconfigured emergency numbers).

In an example embodiment of the disclosure, the home network manager 110 may provide and/or utilize user interface services in the home network. In this regard, the home network manager 110 may be operable to support use of user interface functions, and/or to generate and/or store information corresponding thereto, which may be utilized to enable interactions between the home network manager 110 and users (e.g., in the home network 100). For example, in some implementations, the home network manager 110 may be configured to generate and/or use a graphic user interface (GUI), for visually displaying information and/or providing interactivity with users (e.g., for providing input thereby). One or more user interfaces may enable configuring the home network manager 110 and/or functions provided by the home network manager 110. In an example embodiment of the disclosure, the one or more user interfaces may enable user interaction with, configuring and/or adjusting other elements in the home network 100 (e.g., elements connected to the home network manager 110).

In an example embodiment of the disclosure, the user interfaces may be provided via one or more other devices that may be communicatively coupled to the home network manager 110. For example, a GUI generated and/or used by the home network manager 110 may be displayed using existing home network elements, such as, for example, television 120a, laptop 120b, tablet 120j, and/or smartphone 120k.

The disclosure is not limited to a single network (e.g., home network 100) and/or a single network manager (e.g., home network manager 110). For example, one or more networks (e.g., home network 100) and/or one or more network managers (e.g., home network manager 110) may be grouped together. The grouping may correspond to one or more locations (e.g., location 101).

In an example embodiment of the disclosure, a network (e.g., home network 100) may be associated with one or more network managers (e.g., home network manager 110). For example, one network manager may be associated with one or more networks (e.g., home network 100) and/or locations (e.g., location 101).

In an example embodiment of the disclosure, a grouping of networks may comprise one or more network, network managers and/or locations. The grouping may be programmable and/or configurable. For example, one more networks may be defined, one or more network managers may be assigned per network and/or associated with one or more devices with a network and/or a network manager. In this regard, the information may be shared between the different networks, network managers and/or devices assigned to the different networks and/or network managers. For example, information gathered on one network (e.g., by a network device, through an occurrence of a condition, event, an alarm, and/or other predefined and/or preconfigured condition) may cause the information to be communicated on the same and/or another associated network. In this regard, the information may trigger a condition, an alarm, an occurrence of an event and/or any other predefined and/or preconfigured condition (e.g., operation of a device, network element) on the same and/or another associated network.

In an example embodiment of the disclosure, one or more home network elements (e.g., home network elements 120a-120o) may be configured to provide enhanced functionality, especially in the context of the home network provided by home network managers (e.g., the home network manager 110). For example, rather than utilizing a typical roller shutter controller, an enhanced roller shutter controller may be utilized, such as to provide enhanced shutter device controlling functions, device interface functions and/or other functions in a home network (e.g., the home network 100). An example roller shutter controller is depicted in and/or described with respect to FIG. 2.

Figure 2:
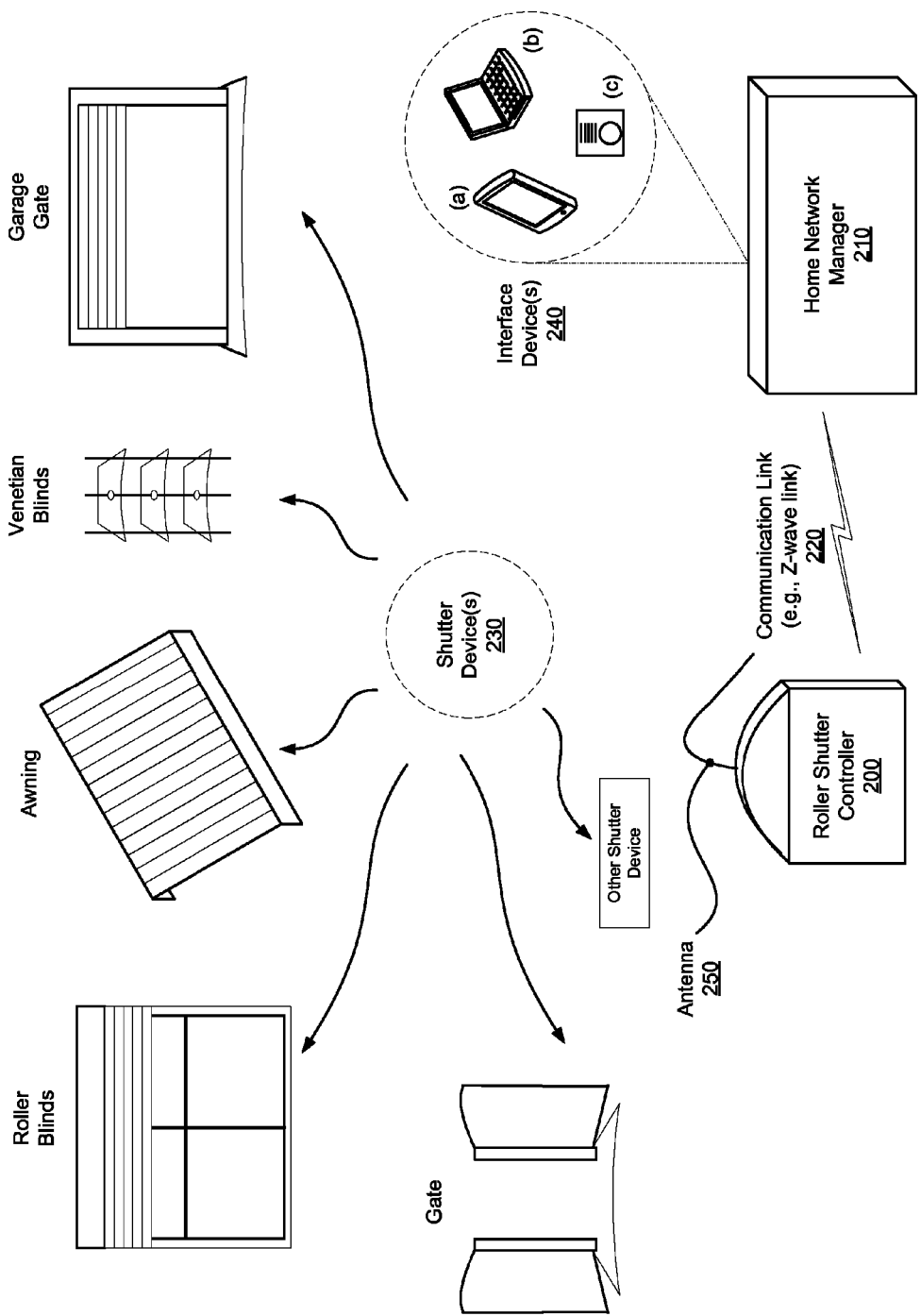
FIG. 2 illustrates an example roller shutter controller.

FIG. 2 illustrates an example roller shutter controller. Referring to FIG. 2, there is shown a roller shutter controller 200.

The roller shutter controller 200 may comprise suitable circuitry, interfaces, logic, and/or code for implementing various aspects of the present disclosure. The roller shutter controller 200 may be implemented and/or configured to provide enhanced control of one or more shutter devices (e.g., shutter device(s) 230), other device control and/or related functions.

A shutter device 230 may comprise one or more roller shutters, window and/or door blinds and/or other window and/or door treatment solutions, awnings, garage doors, gates and/or any other devices that may be controlled by a roller shutter controller, such as, for example, the roller shutter controller 200.

The roller shutter controller 200 may be utilized to control the operation of one or more shutter devices (e.g., shutter device(s) 230). In an example embodiment of the disclosure, the roller shutter controller 200 may be operable to open and/or close a roller shutter device (e.g., open and/or close blinds, roller shutters, doors, gates). In another example embodiment of the disclosure, the roller shutter controller 200 may be operable to control the position of a shutter device (e.g., tilting the blades of Venetian blinds by a certain number of degrees).

In an example embodiment of the disclosure, each shutter device (e.g., shutter device(s) 230) may be associated with (e.g., controlled by) one roller shutter controller (e.g., roller shutter controller 200). In another example embodiment of the disclosure, one or more shutter devices (e.g., shutter device(s) 230) may be associated with (e.g., controlled by) one or more roller shutter controllers (e.g., roller shutter controller 200). For example, one or more shutter devices may be grouped and may be controlled simultaneously, systematically, sequentially and/or through a predefined and/or preconfigured relationship between the one or more shutter devices by, for example, one or more roller shutter controllers. Although the disclosure may refer to one roller shutter controller when describing control of one or more shutter devices, the disclosure is not limited in this way. It is to be understood that various combinations of one or more roller shutter controllers and one or more shutter devices may be implemented.

In an example embodiment of the disclosure, one roller shutter controller (e.g., roller shutter controller 200) may communicate with one or more other roller shutter controllers in order to initiate control of one or more roller shutter devices (e.g., roller shutter device(s) 230) that may be controlled by the one or more other roller shutter controllers. The communication may be direct and/or indirect. For example, the communication may be directly between the one roller shutter controller and one or more other shutter controllers. In this regard, an intermediary may be involved in an initial configuration of the communication between the one roller shutter controller and one or more other roller shutter controllers. For example, an intermediary (e.g., home network manager, master controller for supporting the communication between the one or more roller shutter controllers, and/or other devices) may be used to configured a new roller shutter controller during an installation process. In another example, the communication may be indirect through, for example, an intermediary (e.g., network element, roller shutter controller, shutter device, home network manager, master controller).

In an example embodiment of the disclosure, operation of a roller shutter controller may trigger operation of another shutter controller. For example, a command received by a particular roller shutter controller to, for example, operate a roller shutter device (e.g., close blinds) may trigger operation of one or more other roller shutter controllers, such that, for example, the one or more other roller shutter controls may operate one or more other roller shutter devices that may be associated with the one or more roller shutter controllers (e.g., also closing blinds on the back porch and/or in the living room).

In an example embodiment of the disclosure, the roller shutter controller 200 may control one or more roller shutter devices by controlling one or more electric motors (e.g., AC electric motor) of one or more roller shutter devices. The roller shutter controller 200 may be connected to an electrical motor of a shutter device by one or more electrical leads.

In an example embodiment of the disclosure the roller shutter controller 200 may be operational to precisely control the positioning of a shutter device. For example, roller shutter controller 200 may utilize one or more mechanical and/or electrical switches in a roller shutter device for calibrating and/or controlling the electrical motor of the shutter device. The roller shutter controller 200 may be operable to control any motor through precise calibration, including learning of the limit positions, motor characteristics and/or load conditions of the particular motor.

The roller shutter controller 200 may comprise one or more buttons (and/or other interfaces) (not shown) either inside or outside of the roller shutter controlling for providing basis functionality to the roller shutter controller 200. For example, the roller shutter controller 200 may comprise one or more buttons that may be pressed and/or depressed sequentially and/or for a predetermined and/or preconfigured about of time to operate one or more functions of the roller shutter controller 200. One or more functions of the roller shutter controller 200 may comprise, calibration (e.g., calibrating position, opening and/or closing a shutter device), range testing (e.g., whether the roller shutter controller is within a home network), connecting to a home network (e.g., paring between a roller shutter controller and a home network through, for example, a network manager).

The roller shutter controller 200 may comprise one or more visual and/or audible indicators (e.g., LED(s), speaker(s), and/or other interfaces) (not shown) either inside or outside of the roller shutter controller. The one or more visual and/or audible indicators may be used in connection with, for example, providing visual and/or audible cues indicative of, for example, the status of the roller shutter controller 200 (e.g., within home network range, connected to a home network, in paring mode) and/or operations of the one or more buttons.

The roller shutter controller 200 may operate one or more shutter devices (e.g., shutter device(s) 230) in response to a user request and/or on an occurrence of a predetermined and/or predefined condition. For example, the roller shutter controller 200 may operate (e.g., open, close, move up, move down, tilt) a shutter device in response to a user input, such as for example, a user input captured by an interface device (e.g., interface device(s) 240, home network manger 210).

In an example embodiment of the disclosure, a roller shutter controller 200 may respond to a user input from, for example, one or more switches, and/or buttons, such that the roller shutter controller may, for example, operate the one or more roller shutter devices in response to a manual input (e.g., pressing a button to close a garage gate). For example, in addition to and/or instead of, a user interface such as, for example, a graphical user interface (e.g., GUI depicted and/or described with respect to FIG. 3), a shutter device may be controller through a manual input (e.g., a wall switch). In this regard, the roller shutter controller 200 may be operable to support the manual operation of a shutter device. For example, the roller shutter controller 200 may detect manual input and may allow for the input reach the roller shutter device. In an example embodiment of the disclosure, the roller shutter controller 200 may prevent manual operation of a shutter device through use of, for example, wall switches and/or other control devices (e.g., remote controller). For example, the roller shutter controller 200 may be configurable to allow and/or prevent manual operation of shutter devices on an occurrence of a predetermined and/or preconfigured condition (e.g., burglary alarm, fire alarm, time of day).

In an example embodiment of the disclosure, the operation of the roller shutter controller 200 may be initiated on an occurrence of a predefined and/or preconfigured condition. For example, on an occurrence of a fire alarm, the roller shutter controller 200 may, for example, open all window blinds, unlock doors, and/or open gates and garage doors to allow for a safe escape route. In another example, on an occurrence of a burglary alarm, the roller shutter controller 200 may, for example, close and/or lock all shutter devices, turn off manual operation (e.g., wall switch) of shutter devices to prevent a burglar from escaping while, for example, a call is place to emergency services. The disclosure is not limited to any particular predefined and/or preconfigured condition (e.g., alarm) and/or predefined and/or preconfigured response to the condition. For example, one or more conditions and/or responses may be customized, configured and/or otherwise adjusted.

For example, the operation of the roller shutter controller 200 may be initiated by a home network manager (e.g., home network manager 210) on an occurrence of a predefined and/or preconfigured condition. For example, the operation of the roller shutter controller 200 may be initiated when an alarm condition occurs (e.g., an alarm condition generated by one or more network device and/or a home manager). In one example, an alarm condition indicative of a burglary condition (e.g., triggered by a burglary alarm, a door/window sensor) may initiate the operation of a roller shutter controller 200, such that, for example, the roller shutter controller 200 may operate one or more shutter devices. For example, the roller shutter controller 200 may operate the one or more shutter device such that, for example, the roller shutter controller 200 may initiate, for example, closing and/or locking all or some of the roller shutter devices (based on, for example, a predefined and/or preconfigured condition), such as, for example, some or all of the roller shutters, doors and/or gates may be closed and/or locked.

In an example embodiment of the disclosure, the occurrence and/or control of one or more predefined and/or preconfigured conditions may be managed by, for example, a home network manager (e.g., home network manager 210). For example, the home network manager may detect a predefined and/or preconfigured condition based on, for example, one or more messages and/or signals from one or more network devices (e.g., network elements 120a-k) and/or based on, for example, an occurrence of a predefined and/or preconfigured event (e.g., time of day, day of week, low lighting conditions, alarm armed/disarmed). The home network manager (e.g., home network manager 210) may initiate the operation of a roller shutter controller 200 such that the roller shutter controller 200 may, for example, operate, in a predetermined and/or predefined manner one or more shutter devices (e.g., shutter device(s) 230) in response to the predefined and/or preconfigured condition. The predefined and/or preconfigured condition may, for example, comprise an alarm condition (e.g. fire, burglary) and/or a user and/or system predefined and/or preconfigured condition (e.g., close all roller shutter at night, when roller shutter are closed turn on background lighting).

In an example embodiment of the disclosure, the operation of the roller shutter controller 200 may be initiated by pre-defined and/or preconfigured condition that the roller shutter controller 200 may be operable to determine and/or receive an indication thereof. For example, the roller shutter controller 200 may be operable to determine and/or receive an indication of a condition that may, for example, be determinable through, for example, a sensor. In this regard, the roller shutter controller 200 may comprise one or more sensor and/or may receive input from one or more sensors and/or sensory devices. For example, the roller shutter controller 200 may operate a roller shutter device in response to changing weather and/or timing conditions. In this regard, the roller shutter controller may receive an indication of, for example, an outside temperature. The roller shutter controller 200 may initiate operation of one or more roller shutter devices (e.g., open blinds) in response to the sensory reading (e.g., temperature, rain conditions, time of day).

In another example embodiment of the disclosure, the operation of the roller shutter controller 200 may trigger an operation of another device (other than, for example, a shutter device). For example, when roller shutter controller 200 closes a shutter device (e.g., shutter device(s) 230), the countertop background lighting may be automatically turned on.

The roller shutter controller 200 may be configured for operation on a home network (e.g., home network 100 as depicted in and/or described with respect to FIG. 1), such that, the roller shutter controller 200 may be utilized as a home network element. In this regard, the roller shutter controller 200 may be configured to interact, for example, in a home network (e.g., home network 100 as depicted in and/or described with respect to FIG. 1) with, for example, a home network manager (e.g., home network manager 210). The home network manager may be substantially similar to the home network manager 110 as depicted in and/or described with respect to FIG. 1.

The roller shutter controller 200 may be configured to interact with the home network manager 210 via, for example a communication link 220. The communication link 220 may, for example, comprise a Z-Wave link. The disclosure is not limited to any particular type of a communication link. For example, the roller shutter controller 200 may be implemented to support, for example one or more wireless and/or wired links, protocols and/or connections. For example, wireless links, protocols and/or connections, may comprise, for example, WPAN (e.g., Bluetooth or ZigBee) and/or WLAN (WiFi/802.11) protocols and/or any other wireless links, protocols and/or connections suitable for implementation consistent with the disclosure. Wired links, protocols and/or connections may comprise, for example, Ethernet, Universal Serial Bus (USB), and/or any other wired links, protocols and/or connections suitable for implementation consistent with the disclosure. While not shown in FIG. 2, to support communication with other elements or systems, such as the home network manager 210, the roller shutter controller 200 may incorporate a communication transceiver (e.g., a Z-Wave transceiver) and/ or related processing resources for allowing use of the roller shutter controller 200. The roller shutter controller 200 may comprise an internal and/or external antenna (e.g., antenna 250) for communicating with other devices (e.g., home network manager 210, shutter devices 230, interface devices 240).

In an example embodiment of the disclosure, the roller shutter controller 200 may be designed and/or configured to provide power metering function(s). In this regard, the roller shutter controller 200 may incorporate suitable components (e.g., circuitry) for monitoring power consumption (e.g., of shutter devices controlled by roller shutter controller 200). The roller shutter controller 200 may, for example, be applied at particular sections of the home network to allow control of shutter devices (e.g., shutter device(s) 230), and may monitor and/or track power consumption in a convenient and maintenance-free manner.

In an example embodiment of the disclosure, the roller shutter controller 200 may be operable to monitor ongoing power consumption and/or load conditions and/or any changes of power consumption and/or load conditions. For example, the roller shutter controller 200 may store data and/or information (that may be retrieved at a later time), issue an alert condition and/or other indication when, for example, power consumption by and/or load conditions associated with a particular roller shutter device changed (e.g., a power shutter device may be consuming more power due to weather conditions, such as, for example, ice, snow).

In an example embodiment of the embodiment, an option to reset power consumption settings (e.g., total, annual, average, change in consumption).

In an example embodiment of the disclosure, the roller shutter controller 200 may be operable to initiate an alert condition when, for example, power consumption associated with the one/or more shutter devices (e.g., shutter device(s) 230) (individually and/or in the aggregate) exceeds a predefined and/or preconfigured level.

In an example embodiment of the disclosure, the roller shutter controller 200 may be configured to provide real-time indication of power consumption. For example, the roller shutter controller 200 may incorporate means (e.g., LEDs) for indicating power consumption in visual manner.

In an example embodiment of the disclosure, the power consumption monitoring may comprise collecting power consumption related information. The power consumption information may comprise, for example, data pertaining to power consumption (e.g., current and/or aggregate), and/or additional information, such as, for example, information regarding the shutter device(s) (e.g., type of device, make/model, etc.) that may be controlled by the roller shutter controller 200.

In an example embodiment of the disclosure, the power consumption related information may, for example, be reported by the roller shutter controller 200 to an external device. For example, the information may be communicated to a home network manager (e.g., home network manager 210). The home network manager may, for example, utilize the information to manage the home network and/or adjust operations of various elements of the home network.

In an example embodiment of the disclosure, the roller shutter controller 200 may provide wired and/or wireless interfaces that may enable one or more shutter devices to connect to a home network (e.g., home network 100) and/or home network manager (e.g., home network manager 210). For example, if the network manager provides connectivity of various devices to a home network, for example, based on a Z-Wave protocol, the roller shutter controller 200 may, for example, contain suitable circuitry, interfaces, logic, and/or code that may enable a particular device that, for example, may not be compatible with the example Z-Wave protocol (and/or any other particular protocol that the network manager supports) to connect to the network manager and/or the home network.

In an example embodiment of the disclosure, the roller shutter controller 200 may comprise one or more input/output ("I/O") interfaces. The I/O interface may comprise suitable logic, circuitry, interfaces, and/or code that may be operable to enable user interactions with the roller shutter controller 200 through interfaces, such as, for example, interfaces provided by the example interface device(s) 240a-c. The I/O interface may obtain input from user(s) of the roller shutter controller 200 and/or provide output to the user(s). The I/O interface may support various types of inputs and/or outputs, including, for example, video, audio, and/or textual. In this regard, dedicated I/O devices and/or components, external to or integrated within the roller shutter controller 200, may be utilized for inputting and/or outputting data during operations of the I/O interface. Exemplary (external or integrated) I/O devices may comprise displays, mice, keyboards, touchscreens, voice input interfaces, and other input/output interfaces or devices.

The example interface device(s) 240a-c may, for example, provide a graphical user interface (GUI) for controlling the operation of one or more roller shutter controllers (e.g., roller shutter controller 200) and/or one or more shutter devices (e.g., shutter device(s) 230) associated with the one or more of the one or more roller shutter controllers. A GUI may, for example, comprise, in whole or in part, an example GUI as depicted in and/or described with respect to FIG. 3.

In an example embodiment of the disclosure, the roller shutter controller 200 may provide other wired and/or wireless interfaces that may enable one or more devices to connect to a home network (e.g., home network 100) and/or home network manager (e.g., home network manager 210). For example, if the network manager provides connectivity of various devices to a home network, for example, based on a Z-Wave protocol, the roller shutter controller 200 may, for example, contain suitable circuitry, interfaces, logic, and/or code that may enable a particular device that, for example, may not be compatible with the example Z-Wave protocol (and/or any other particular protocol that the network manager supports) to connect to the network manager and/or the home network.

In an example embodiment of the disclosure, the roller shutter controller 200 may be operable to communicate with a network manager (e.g., home network manager 210). The roller shutter controller 200 may communicate, to the network manager, information and/or data relating to, for example, status of the roller shutter controller 200 and/or one or more shutter devices (e.g., shutter device(s) 230) that may be controlled by the roller shutter controller 200. The communications may comprise status information, predefined and/or predetermined (e.g., alarm) conditions and/or any other information that may be relevant to the operation of the roller shutter controller 200, the one or more shutter devices that may be controlled by the roller shutter controller 200 and/or any other information that may be relevant to the operation of a home network. The status and/or predefined and/or predetermined (e.g., alarm) conditions may comprise status and/or alarm conditions associated with operation of shutter devices (e.g., shutter device closed/open, shutter device not responding), power consumption monitoring, roller shutter controller status (e.g., roller shutter controller on/off) and/or any other information.

In an example embodiment of the disclosure, the roller shutter controller 200 may also receive communications from the network manager. The communications may, for example, comprise information relating to predefined and/or predetermined conditions and/or information comprising commands that may be executed on the roller shutter controller 200 (e.g., closing/opening one or more shutter devices, for example, in response, to an alarm condition).

In an example embodiment of the disclosure, the roller shutter controller 200 may incorporate a wireless range tester (not shown) that may be operable to, for example, determine whether the roller shutter controller 200 is within a range of a home network manager (e.g., home network manager 210) and/or other network element. In this regard, the roller shutter controller 200 may be operable to generate an alarm condition when the roller shutter controller 200 is not within a range of any home network manager (e.g., home network manager 210) and/or other network element and/or when the roller shutter controller 200 that, for example, was previously within the range of a (e.g., home network manager 210) and/or other network element, is now outside of that range. In an example embodiment of the disclosure, the alarm condition may active one or more alarm indicators to generate an alarm condition by, for example, generating an audible and/or a visual alarm.

In another example embodiment of the disclosure, the home network manager 210 may be operable to generate an alarm condition, when for example, the roller shutter controller that, for example, was previously within the range of the home network manager 210, is now outside of that range.

In another example embodiment of the disclosure, wireless range tester may indicate whether the roller shutter controller 200 is in range, is in an intermediate range and/or is out of range of a home network manager. The in range indication may, for example, be associated with a condition where the roller shutter controller 200 may establish a direct connection with a home network manager (e.g., home network manager 210) and whether or not a direct communication is desirable (e.g., the roller shutter controller 200 may, for example, communicate with the home network manager utilizing other network elements although a direct communication would be possible). The in an intermediate range condition may, for example, be associated with a condition where the roller shutter controller 200 may not establish a direct connection with a home network manager (e.g., the home network manager 210) but may establish an indirect communication with the home network manager (e.g., through other network elements). The out of range indication may, for example be associated with a condition where the roller shutter controller 200 may not be able to establish either a direct and/or in direct communication with a home network manager (e.g., the home network manager 210).

In an example embodiment of the disclosure, the roller shutter controller 200 may indicate whether the roller shutter controller is in range (e.g., direct, indirect) and/or out of range through one or more audio and/or visual indicators. The indicators may be, for example, integrated with and/or external to the roller shutter controller 200. For example, the roller shutter controller may comprise an external visual indicator (e.g., LED, RGB, RGBW light) that may be operable to display the status of the roller shutter controller 200 with respect to the range through different colors and/or illumination schemes. For example, a visual indicator may display a different color depending on the in-range status (e.g., one color may indicate that the roller shutter controller 200 is in a direct range, a second color may indicate that the roller shutter controller 200 is in indirect range and/or a third color may indicate that the roller shutter controller 200 is out of range). In another example, the visual indicator may blink at different frequencies, illuminate without blinking and/or be operable to display different illumination schemes depending on the in-range status of the roller shutter controller.

In an example embodiment of the disclosure, the roller shutter controller 200 may comprise other suitable circuitry, interfaces, logic, and/or code for implementing various aspects of the present disclosure. For example, the roller shutter controller 200 may comprise a memory and/or a processor.

The memory may store, for example, configuration data, which may comprise parameters and/or code, comprising software and/or firmware. The memory may comprise different memory technologies, including, for example, read-only memory (ROM), electrically erasable programmable ROM (EEPROM), random access memory (RAM), low latency nonvolatile memory, flash memory, solid-state drive (SSD), field-programmable gate array (FPGA), and/or other suitable electronic data storage capable of storing data, code and/or other information.

In an example embodiment of the disclosure, the roller shutter controller 200 may be operable to receive software and/or firmware updates. For example, the roller shutter controller 200 may receive software and/or firmware updates from a network manager (e.g., the home network manager 210). In an example embodiment of the disclosure the software and/or hardware updates may be received, processed and/or installed automatically and/or manually. For example, the process may be completely automatic (e.g., a network manager may send an update to the roller shutter controller and the roller shutter controller may process it automatically), and/or semi-automatic (e.g., an update may be initiated by a user through, for example, a network manager, and may, for example, be processed by the roller shutter controller automatically) and/or manual (e.g., an update may be initiated by a user through, for example, a network manager and/or through an interface on the roller shutter controller, and may, for example, be processed by the roller shutter controller in response to a user action indicative of a desire to install the particular update (e.g., through an interface)).

The processor may comprise suitable circuitry, interfaces, logic, and/or code that may be operable to process data, and/or control and/or manage components, operations and/or functions of the roller shutter controller 200, and/or tasks performed therein. In this regard, the processor may configure and/or control operations of various components and/or subsystems of the roller shutter controller 200, such as, for example, the memory, the communication subsystem (e.g., for communicating with, for example, the home network manager 210) by utilizing, one or more control signals.

Figure 3:
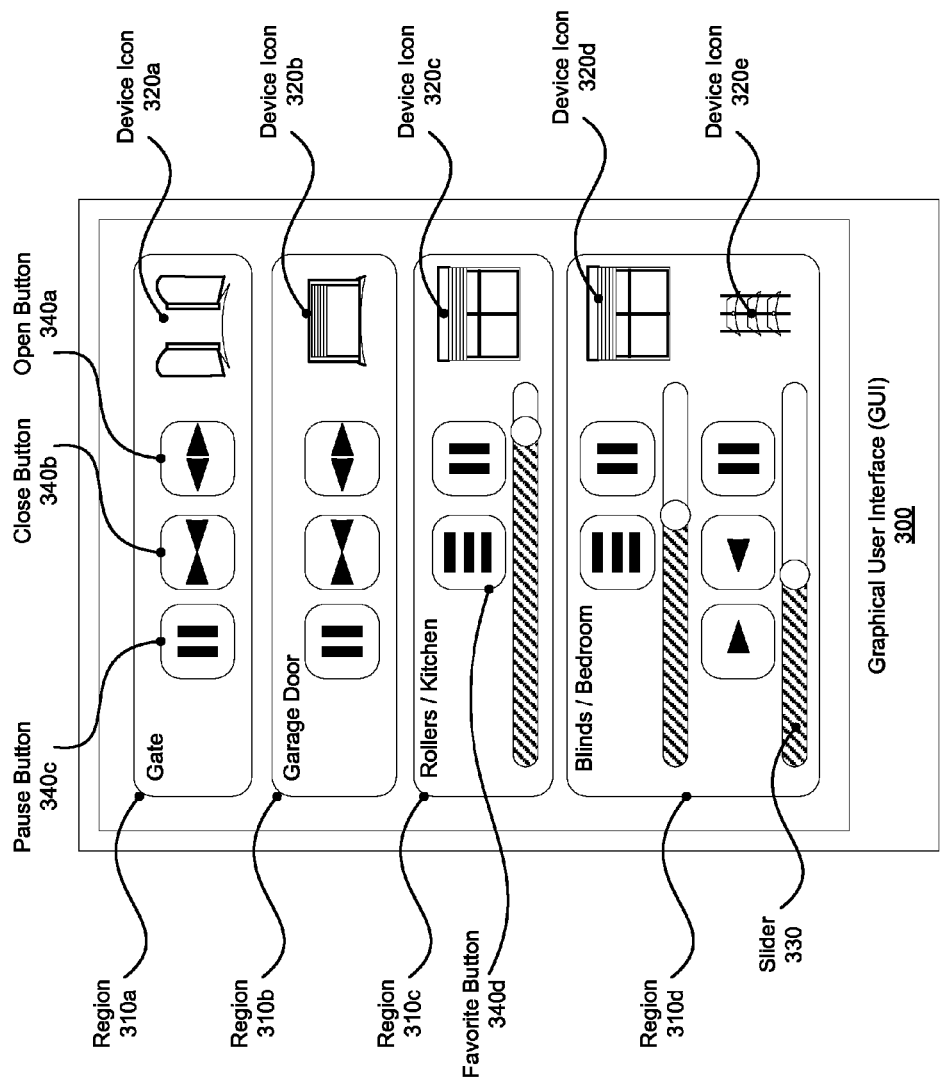
FIG. 3 illustrates an example GUI for controlling one or more example shutter devices that may be connected to a roller shutter controller.

FIG. 3 illustrates an example GUI for controlling one or more example shutter devices that may be connected to a roller shutter controller. Referring to FIG. 3, there is shown an example GUI 300 for controlling example roller shutter devices.

The example GUI 300 may comprise one or more regions (e.g., region(s) 310a-d). Each region 310a-d may comprise one or more controls for controlling a particular shutter device (e.g., slider(s) 330, buttons 340a-d), one or more shutter device icons (e.g., shutter device icons 320a-e), and/or other controls and/or visual indicators (e.g., text, graphics) that may be associated with one or more shutter devices (e.g., shutter device(s) 230) that may be connected to a home network (e.g., home network 100) through one or more roller shutter controllers (e.g., roller shutter controller 200).

A region (e.g., region 310a-d) may comprise one or more controls for controlling one or more features of a shutter device that may be associated with the particular region. For example, a region may comprise a slider control (e.g., slider 330) for partially and/or fully closing and/or opening a shutter device. In another example, a region may comprise one or more buttons or other interfaces for controlling one or more functions of one or more shutter devices (e.g., open button 340a, close button 340b, pause button 340c, favorite button 340d).

An open button (e.g., open button 340a) may be operational to, for example, partially and/or fully open a shutter device (e.g., gate, garage door, rollers, blinds). A close button (e.g., close button 340b) may be operational to, for example, partially and/or fully close a shutter device (e.g., gate, garage door, rollers, blinds).

A pause button 340c may be operational to, for example, stop a shutter device in its current position during, for example, an open and/or close cycle (e.g., initiated by pressing the open button 340a and/or the close button 340b). For example, a user may become aware of a condition that may interfere with closing of a shutter device (e.g., an object in the closing pathway) and may want to pause closing of the shutter device by pressing the pause button 340c. The pause button 340c may be operation to, for example, open, close and/or otherwise operate a shutter device, after a predefined and/or preconfigured time period. For example, an operation of a pause button 340c may allow a user to safely exit a garage or clear path way without having to later initiate closing of the garage door or a gate.

A favorite button 340d may be operational to, for example, configure and/or recall a shutter device to a favorite shutter device position (e.g., fully and/or partially open/closed/tilted blinds).

In an example embodiment of the disclosure, the roller shutter controller 200 may be operational to revive input and/or respond to input from, for example, a safety device (e.g., an IR barrier). For example, the roller shutter controller 200 may prevent opening, closing and/or otherwise operating a roller shutter device based on, for example, input from a safety device. In an example embodiment of the disclosure, the roller shutter controller 200 may, for example, prevent closing of a shutter device when an object (e.g., physical object, person, animal) is detected within, for example, an IR barrier. The roller shutter controller 200 may attempt to close the shutter device again when, for example, the safety device indicates that the safety condition is no longer present (e.g., no object in the way of closing a shutter device). In an example embodiment of the disclosure, the roller shutter controller 200 may operate in response to input from a safety device, for example, in response to an open, close and/or pause command (e.g., pressing the open button 340a, close button 340b and/or, pause button 340d, respectively) and/or on an occurrence of a predefined and/or preconfigured condition.

A region (e.g., region 310a-d) may comprise one or more shutter device icons (e.g., device icons 320a-e.) The shutter device icons may provide a user with a graphical representation of a shutter device and/or a particular functionality related to controlling one or more aspects of a shutter device that may be controlled by one or more roller shutter controllers. For example, an example region 310a-c each comprises one shutter device icon, 320a-c, respectively, to indicate, for example, that a particular shutter device to be controlled is, a gate, a garage door or a roller shutter, respectively. As another example, the example region 310d comprises two shutter device icons, 320d and 320e to indicate that the particular roller shutter device (e.g., blinds) associated with region 310d may be controlled by for example, opening or closing the shutter device (e.g., device icon 320d) and/or adjusting the position of the shutter device by, for example, tilting the blades of the blinds (e.g., device icon 320e).

A region (e.g., region 310a-d) may comprise other visual indicators, such as, for example text. For example, regions 310a-d may comprise text that may be indicative of a location (e.g., kitchen, bedroom) and/or a type of a shutter device (e.g., gate, garage door, rollers, blinds) that may be controlled though the controls contained within the particular region.

The disclosure is not limited to a particular association of one or more regions with one or more shutter devices. It is to be understood that the region may be defined, for example, per shutter device, shutter device type (e.g., grouping of the same type of shutter devices), location (e.g. all devices in the bedroom), etc. In an example, embodiment of the disclosure, one or more regions may be provided per GUI screen (e.g., GUI 300) that may correspond to a particular location. For example, information and controls may be provided to a user in one or more groupings, such as, for example, a grouping of some or all shutter devices of a particular type (e.g., blinds), a grouping of some or all shutter devices in a particular location, a grouping of some or all network elements of a particular type (e.g., flood sensor) in particular location, a grouping of some or all network elements in particular location, etc. In is to be understood that other network elements (e.g. devices in place of or in addition to shutter devices) may be included on a particular GUI screen. For example, a grouping of devices per location may include one or more regions corresponding to some or all network elements (e.g., flood sensor, shutter devices, lighting) that may be associated with the particular location.

The disclosure is not limited to a particular GUI and may comprise any other GUI and/or interface that may be suitable for controlling one or more shutter devices connected to home network through one or more roller shutter controllers. It is to be understood that various button, touch-screen and other interfaces implementing one or more user/control screens may be implemented.

Figure 4:
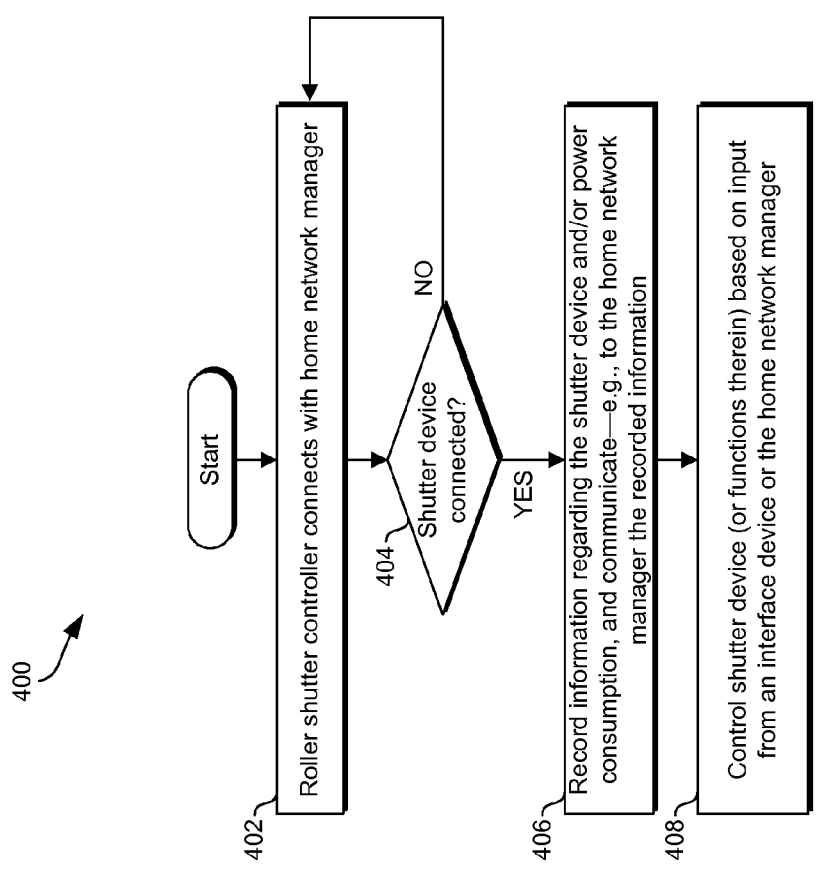
FIG. 4 illustrates an example flow chart of a method for an example process for managing one or more roller shutter controllers.

FIG. 4 illustrates an example flow chart of a method for an example process for managing one or more roller shutter controllers. Referring to FIG. 4, there is shown a flow chart 400 comprising a plurality of example steps.

In example step 402, a roller shutter controller (e.g., the roller shutter controller 200 as depicted in and/or described with respect to FIG. 2) may connect with a home network manager (e.g., the home network manager 210 as depicted in and/or described with respect to FIG. 2). The connection may comprise a communication link (e.g., the communication link 220 as depicted in and/or described with respect to FIG. 2), such as, for example, a Z-Wave link. The connection may comprise one or more types of wireless and/or wired connections. The connecting may, in some instances, comprise determining whether the roller shutter controller is within range of the home network manager. In this regard, the roller shutter controller may incorporate a wireless range tester for determining whether the roller shutter controller is within a range of a home network manager as described with respect to FIG. 2, for example.

In example step 404, it may be determined whether a shutter device has been connected to the roller shutter controller. In instances where no shutter device is connected in, the process may loop back to the example step 402. In instances where a shutter device is plugged, however, the process may proceed to example step 406.

In example step 406, information regarding the connected shutter device and/or the power consumption (e.g., current and/or aggregate) may be recorded. The recorded information may then be reported. In this regard, the information may be communicated to other systems (e.g., the home network manager, through communication links between the home network manager and the roller shutter controller). In an example embodiment of the disclosure, the recordation step may be optional and/or the information may be communicated outside of the roller shutter controller (e.g., to network manager).

In example step 408, the shutter device (or functions therein) may be controlled, through the roller shutter controller, for example, based on input from the home network manager.

Figure 5:
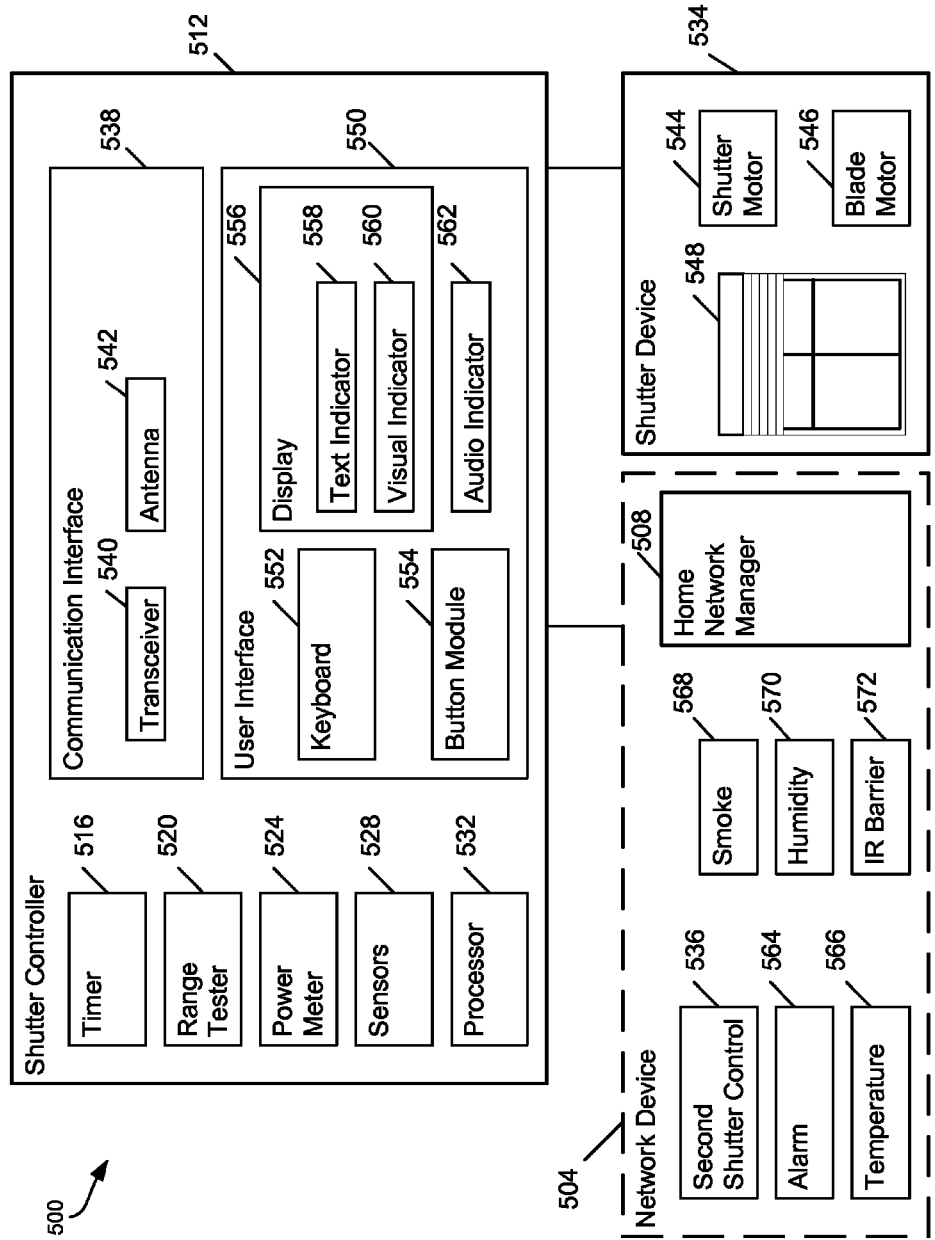
FIG. 5 illustrates an example shutter control system.

FIG. 5 illustrates an example shutter control system 500 for use with a plurality of network elements or devices 504 similar to the elements 120a-120o of FIG. 1 and a home network manager 508 similar to the home network manager 210 of FIG. 1, in a home network similar to the home network 100 of FIG. 1. Thus, in the embodiment as shown, the network device 504 generically refers to any devices and/or network managers within a network similar to the home network 100 of FIG. 1. The shutter control system 500 includes a shutter controller 512 (similar to the shutter controller 200 of FIG. 2). The shutter controller 512 may include a plurality of modules and/or devices including a timer 516, a range tester 520, a power meter 524, sensors 528, and a processor 532.

For example, the shutter controller 512 may actuate a shutter device 534 when the timer 516 reaches a predefined condition, such as, for example, a specific time of the day, or an amount of time after a certain other network device is turned off.

As discussed above, the shutter controller 512 may use the range tester 520 to determine if the shutter controller 512 is within a range of the home network manager 508. If the shutter controller 512 determines that the shutter controller 512 is within a range of the home network manager 508, the home network manager 508 may be associated with the shutter controller 512. In some embodiments, the shutter controller 512 may be associated with the home network manager 508 through a different shutter controller, or with the different shutter controller, such as, for example, second shutter controller 536.

In some embodiments, the power meter 524 may record data indicative of the power consumption associated with the shutter device 534. In this regard, the recorded information may be communicated to the network device 504, such as, for example, the home network manager 508, through communication links between the home network manager 508 and/or the shutter controller 512.

In the embodiment shown, the sensors 528 may determine weather and/or timing conditions proximate the shutter device 534 and/or the shutter controller 512, depending on applications. For example, the shutter controller 512 may operate the shutter device 534 in response to changing weather and/or timing conditions as detected by the sensors 528. In this regard, the shutter controller 512 may receive an indication of, for example, an outside temperature through the sensors 528.

The processor 532 may also include internal memory for storing data with respect to operations of the shutter controller 512 and power metering information as discussed above. In some embodiments, the sensors 528 may sense a condition, such as, for example, an exterior temperature. The processor 532 may determine if the sensed condition, the sensed temperature, meets or exceeds a predefined condition, such as, for example, a temperature threshold, the processor 532 may generate an actuation signal. A communication interface 538 may transmit through a transceiver 540 and/or an antenna 542 data indicative of the actuation signal to the shutter device 534. In the embodiment shown, the shutter device 534 includes a shutter motor 544 and an optional blade motor 546 to control a shutter 548 (similar to devices 230 of FIG. 2). In some embodiments, in response to receiving data indicative of the actuation signal, the shutter motor 544 may move the shutter 548 to an open position in which the shutter 548 may be completely opened, a closed position in which the shutter 548 may be completely closed, and a third position in which the shutter 548 is between the open position and the closed position. In the embodiments where the shutter 548 are Venetian or vertical that further include a plurality of tiltable blades, the actuation signal may also include data or signals that actuate the optional blade motor 546 to tilt some or all of the blades to a predefined number of degrees. In some other embodiments, a user may configure the number of tilting degrees through the network device 504 (for example, the home network manager 508), or a user interface 550.

In the embodiment shown, the user interface 550 includes a keypad or keyboard 552, and a button module 554, to allow a user to interact with and/or manually control operations of the shutter controller 512. For example, in some embodiments, the button module 554 may include a favorite button (not shown) that, upon activation, recalls a favorite position of the shutter 548, and/or a favorite tilting degree of the blades. In some embodiments, a user may also program the shutter controller 512 and/or other network device 504 (for example, the second shutter control 536) with the keyboard 552.

In the embodiment shown, the user interface 550 may also include an optional display 556 (similar to the graphical user interface 300 of FIG. 3) that may further include a text indicator 558 and a visual indicator 560. The user interface 550 may also include an optional audio indicator 562 to generate audial signals, such as, for example, an alarm signal. For example, in some embodiments, when the shutter controller 512 is determining an operating range with the range tester 520 with respect to the home network manager 508, the audio indicator 562 may generate a first audial signal to indicate an appropriate operating range, and may generate a different audial signal to indicate an inappropriate operating range, for example, when the shutter controller 512 is outside of the operating range of the home network manager 508.

In the embodiment shown, the network device 504 may also include a plurality of elements or devices similar to the elements 120a-120o of FIG. 1 in a home network similar to the home network 100 of FIG. 1. For example, the network device 504, in addition to the home network manager 508 and the second shutter control 536, may also include an alarm 564 similar to the security devices 120i of FIG. 1, a temperature sensor 566 similar to environmental sensory devices 120h of FIG. 1, a smoke detector 568 similar to the security devices 120i of FIG. 1, a humidity sensor 510 similar to environmental sensory devices 120*h* of FIG. 1, and an infra-red (IR) barrier 512 similar to the security devices 120*i* of FIG. 1.

In some embodiments, the network device 504, for example, the home network manager 508, may send an indication indicative of a time of day to the shutter controller 512. The processor 532, after the transceiver 540 has received the indication from the network device 504, may determine if the indication meets one or more predefined conditions, such as, for example, a particular or predefined time of day. If the processor 532 determines that the indication meets one or more predefined conditions, the processor 532 may generate an actuation signal, and may cause the transceiver 540 to transmit the actuation signal to the shutter device 534. In the embodiments where the shutter 548 includes Venetian blinds or Vertical blinds, the actuation signal may also include data indicative of a tilting degree for some or all of the blades. Upon receiving the actuation signal from the shutter controller 512, the shutter device 534 may actuate the shutter motor 544 and/or the optional blade motor 546 to move the shutter 548 to an open position in which the shutter 548 may be completely opened, a closed position in which the shutter 548 may be completely closed, and a third position in which the shutter 548 is between the open position and the closed position. In the embodiment where the shutter 548 includes Venetian blinds or vertical blinds, the the shutter device 534 may operate to actuate the optional blade motor 546 to tilt the associated blades based on the data embedded in the actuation signal. In some embodiments, the blade motor 546 may include a step motor.

In other embodiments, the home network manager 508, may also send an indication indicative of a user request or an occurrence of a programmed condition. For example, a user may select to operate, to open, or to close the shutter 548 through the home network manager 508. Further, when the home network manager 508 detects or senses a predefined condition, such as, for example, a fire through the fire alarm 564, the home network manager 508 may also send an indication indicative of such fire conditions to the shutter controller 512. In turn, the shutter controller 512 checks to determine if the indication indicates a fire alarm. If the processor 532 determines that the indication indicates a fire alarm, the processor 532 generates an actuation signal for the transceiver 540 to transmit to the shutter device 534.

In still other embodiments, the second shutter controller 536 may also send an indication indicative of a detected fire alarm to the shutter controller 536. Thus, the home network manager 508 is bypassed. If the processor 532 determines that the indication indicates a fire alarm, the processor 532 may generate an actuation signal for the transceiver 540 to transmit to the shutter device 534.

In yet other embodiments, the alarm 564 may also directly send an indication indicative of a burglary alarm to the shutter controller 536. If the processor 532 determines that the indication indicates a burglary alarm, the processor 532 may generate an actuation signal for the transceiver 540 to transmit to the shutter device 534. In such a case, the shutter device 534 may lock the shutter motor 544 if the shutter 548 is in the closed position, or cause the shutter motor 544 to move the shutter 548 to the closed position and to lock the shutter 548 at the closed position. In some embodiments, the processor 532 may also generate a second indication to prevent the shutter 548 from any manual operation. Conversely, if processor 532 determines that the indication indicates a fire alarm, the processor 532 may generate a different actuation signal for the transceiver 540 to transmit to the shutter device 534. In such a case, the shutter device 534 may lock the shutter motor 544 if the shutter 548 is already in the open position, or cause the shutter motor 544 to move the shutter 548 to the open position and to lock the shutter 548 at the open position.

In still other embodiments, when the humidity sensor 570 senses a relatively high exterior humidity percentage, the humidity sensor 570 and/or the home network manager 508 may also send an indication indicative of the high exterior humidity percentage to the shutter controller 536. If the processor 532 determines that the indication of high exterior humidity percentage exceeds a predefined exterior humidity indicative of comfort, the processor 532 may generate an actuation signal for the transceiver 540 to transmit to the shutter device 534. In such a case, the shutter device 534 may cause the shutter motor 544 to move the shutter 548 to the closed position. Similarly, when the IR barrier 572 detects an obstruction proximate the shutter 548, the IR barrier 572 and/or the home network manager 508 may also send an indication indicative of an obstruction alert to the shutter controller 536. If the processor 532 determines that the indication indicates an obstruction alert, the processor 532 may generate an actuation signal for the transceiver 540 to transmit to the shutter device 534. In such a case, the shutter device 534 may cause the shutter motor 544 to prevent closing of the shutter 548.

In some embodiments, the shutter controller 512 may also act as intermediary. For example, the shutter controller 512 and/or the network device 504 may sense a condition, such as, for example, the conditions as discussed above. In response to having detected the condition, the shutter controller 512 may communicate an actuation signal to the shutter device 534. The shutter device 534 may actuate the shutter motor 544 as discussed above. While the shutter device 534 is operating, or after the shutter device 534 has actuated the shutter motor 544 and/or the blade motor 546, the transceiver 540 may also transmit the detected condition and/or the actuation signal to the network device 504, such as, for example, the home network manager 508. In turn, the home network manager 508 processes the received signal, either the detected condition or the actuation signal, and generates a control signal to control other network device 504. For example, when the shutter controller 512 operates to shut the shutter 548 due to an exterior weather condition detected, the home network manager 508 may in turn transmit signals to shut one or more windows in the location 101. For another example, when the shutter controller 512 operates to lock the shutter 548 in the closed position due to a detected fire alarm, the home network manager 508 may also transmit information to devices, such as, for example, mobile phone 120*k* of FIG. 1 to inform a user of such condition.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a roller shutter controller.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

The invention claimed is:

1. A shutter control system for use with a network, the shutter control system comprising:
   a network device coupled to said network, and configured to communicate an indication;
   a shutter controller configured to receive said indication, to determine if said indication meets a predefined condition, and, in response to said indication meeting said predefined condition, to communicate an actuation signal; and
   a shutter device, having at least one motor, configured to receive said actuation signal, and to operate said at least one motor based on said received actuation signal,
   wherein said shutter device comprises a plurality of blind blades, and wherein said shutter device further comprises a blade motor configured to move one or more of said plurality of blind blades to one of a plurality of predefined degrees based on said actuation signal.

2. A shutter control system of claim 1, wherein said shutter device further comprises a shutter configured to have an open position in which the shutter is opened, and a closed position in which the shutter is closed, and wherein said shutter motor is further configured to move said shutter to one of said open position, said closed position, and a third position in which the shutter is between said open position and said closed position.

3. A shutter control system of claim 1, wherein said network device includes at least one of a second shutter device, a temperature sensor, a humidity sensor, and a timer.

4. A shutter control system of claim 1, wherein said network device includes a network manager, and wherein said shutter controller further includes a range tester configured to determine said shutter controller is within a predetermined distance from said network manager.

5. A shutter control system of claim 4, wherein said network manager is further configured to communicate said indication in response to at least one of a user request and an occurrence of a programmed condition.

6. A shutter control system of claim 1, wherein said shutter controller further comprises at least one of a visual indicator configured to provide a visual cue, and an audible indicator configured to provide an audible cue, indicative of a status of at least one of the shutter controller and the shutter.

7. A shutter control system of claim 1, wherein said predefined condition comprises at least one of a temperature and an alarm.

8. A shutter control system comprising:
   a network device configured to perform a function;
   a network manager coupled to said device, and configured to communicate control signals to said network device; and
   a shutter system coupled to said network manager, the shutter system having:
      a sensor configured to sense a condition,
      a shutter controller, in response to the sensed condition meeting a predefined condition, configured to communicate an actuation signal,
      a shutter device, having at least one motor, configured to receive said actuation signal, and to operate said at least one motor based on said received actuation signal, and
      a communication transceiver, in response to said actuation signal, configured to communicate said actuation signal to said network manager; and
   wherein said network manager is further configured to process said actuation signal, to generate said control signals associated with said network device and said actuation signal, and to communicate said control signals to said network device to perform said function, and
   wherein said shutter comprises a plurality of blind blades, and wherein said shutter device further comprises a blade motor configured to move one or more of said plurality of blind blades to one of a plurality of predefined degrees based on said actuation signal.

9. A shutter control system of claim 8, wherein said shutter device further comprises a shutter configured to have an open position in which the shutter is completely opened, and a closed position in which the shutter is completely closed, and wherein said motor is further configured to move said shutter to one of said open position, said closed position, and a third position in which the shutter is between said open position and said closed position.

10. A shutter control system of claim 8, wherein said network device includes at least one of a second shutter device and an alarm.

11. A shutter control system of claim 8, wherein said shutter controller further includes a range tester configured to determine said shutter controller is within a predetermined distance from said network manager.

12. A shutter control system of claim 11, wherein said network manager is further configured to communicate said actuation signal in response to at least one of a user request and an occurrence of a programmed condition.

13. A shutter control system of claim 8, wherein said shutter controller comprises at least one of a visual indicator configured to provide a visual cue, and an audible indicator configured to provide an audible cue, indicative of a status of at least one of the shutter controller and the shutter.

14. A shutter control system of claim 8, wherein said predefined condition comprises at least one of a temperature and an alarm.

\* \* \* \* \*